(12) United States Patent
Reinhard et al.

(10) Patent No.: US 6,993,791 B2
(45) Date of Patent: Feb. 7, 2006

(54) ALTITUDE PROTECTION DEVICE

(75) Inventors: Andreas Reinhard, Zurich (CH);
Wendelin Egli, Seuzach (CH)

(73) Assignee: LSS Life Support Systems AG, Glattbrugg (CH)

( * ) Notice: Subject to any disclaimer, the term of this patent is extended or adjusted under 35 U.S.C. 154(b) by 22 days.

(21) Appl. No.: 10/483,837

(22) PCT Filed: Jul. 15, 2002

(86) PCT No.: PCT/CH02/00386

§ 371 (c)(1),
(2), (4) Date: Jan. 13, 2004

(87) PCT Pub. No.: WO03/020586

PCT Pub. Date: Mar. 13, 2003

(65) Prior Publication Data

US 2004/0168244 A1 Sep. 2, 2004

(30) Foreign Application Priority Data

Mar. 14, 2002 (CH) .................................. 0439/02

(51) Int. Cl.
*B64D 10/00* (2006.01)
(52) U.S. Cl. ................. 2/2.14; 2/456; 600/20
(58) Field of Classification Search .................. 2/456, 2/458, 2.11, 2.13, 2.14, 69, 81, DIG. 3; 600/20
See application file for complete search history.

(56) References Cited

U.S. PATENT DOCUMENTS

| 2,475,479 | A | * | 7/1949 | Schroeder et al. | ............. 600/20 |
| 2,871,849 | A | * | 2/1959 | Clark et al. | .................... 600/20 |
| 2,886,027 | A | * | 5/1959 | Henry | .......................... 600/20 |
| 2,929,377 | A | * | 3/1960 | Cummins | .............. 128/204.25 |
| 3,392,405 | A | * | 7/1968 | Davis et al. | .................. 2/2.14 |
| 3,523,301 | A | * | 8/1970 | Davis et al. | .................. 2/2.14 |
| 3,628,531 | A | * | 12/1971 | Harris | .................... 128/202.11 |
| 5,007,893 | A | * | 4/1991 | Row | ........................... 600/20 |
| 5,226,410 | A | * | 7/1993 | Fournol | .................. 128/202.11 |
| 5,238,008 | A | * | 8/1993 | Monson et al. | ............. 600/561 |
| 6,325,754 | B1 | * | 12/2001 | Reinhard et al. | ............. 600/20 |

FOREIGN PATENT DOCUMENTS

EP 0983190 3/2000

* cited by examiner

*Primary Examiner*—Rodney M. Lindsey
(74) *Attorney, Agent, or Firm*—Jenkens & Gilchrist, P.C.

(57) ABSTRACT

An altitude protection device for an acceleration protection suit having a plurality of liquid-filled veins is comprised of a bladder inserted in a pocket. A spacer fabric that is non-compressible under the loads to be provided is enclosed in the pocket and defines a minimum volume inside the bladder. The bladder is closed off or opened relative to surrounding air in the aircraft cabin via a valve that is opened if a rate of pressure change in the cabin is less than or equal to a presettable maximum value, and closed if the rate of pressure change is greater than the value. If the valve closes and the pressure falls further, air located in the bladder inflates the bladder and pocket, increasing tensile stress in the fabric, and thereby raising the internal pressure of the veins resulting in increased internal pressure in the entire acceleration protection suit.

10 Claims, 3 Drawing Sheets

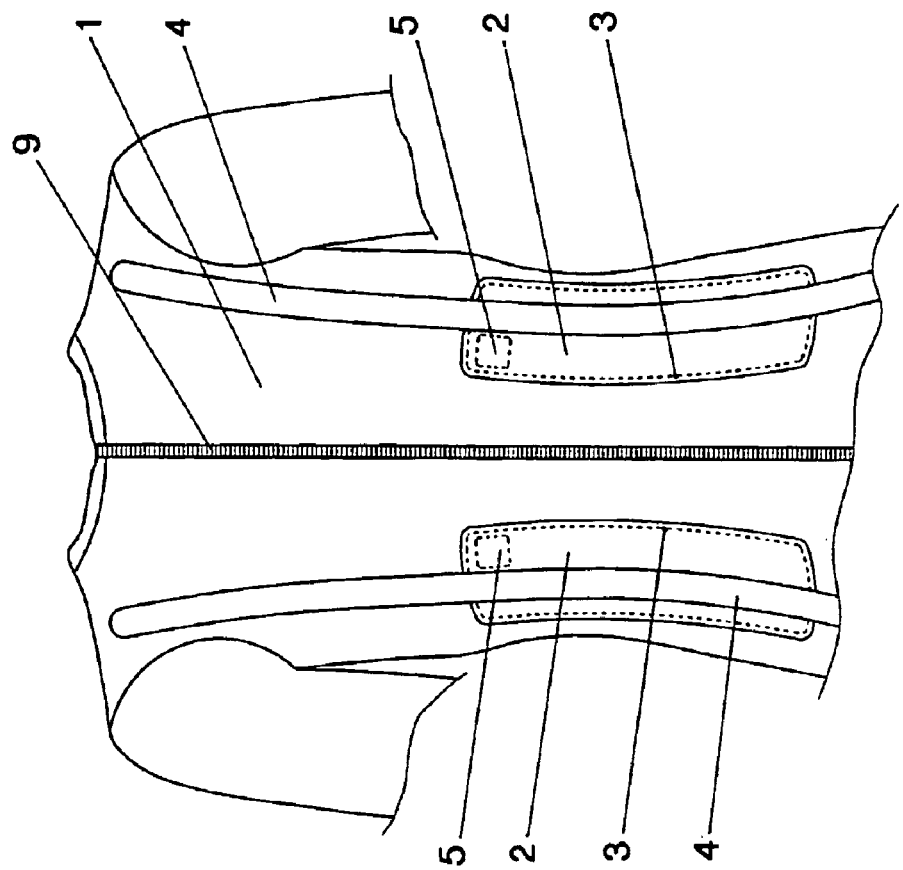
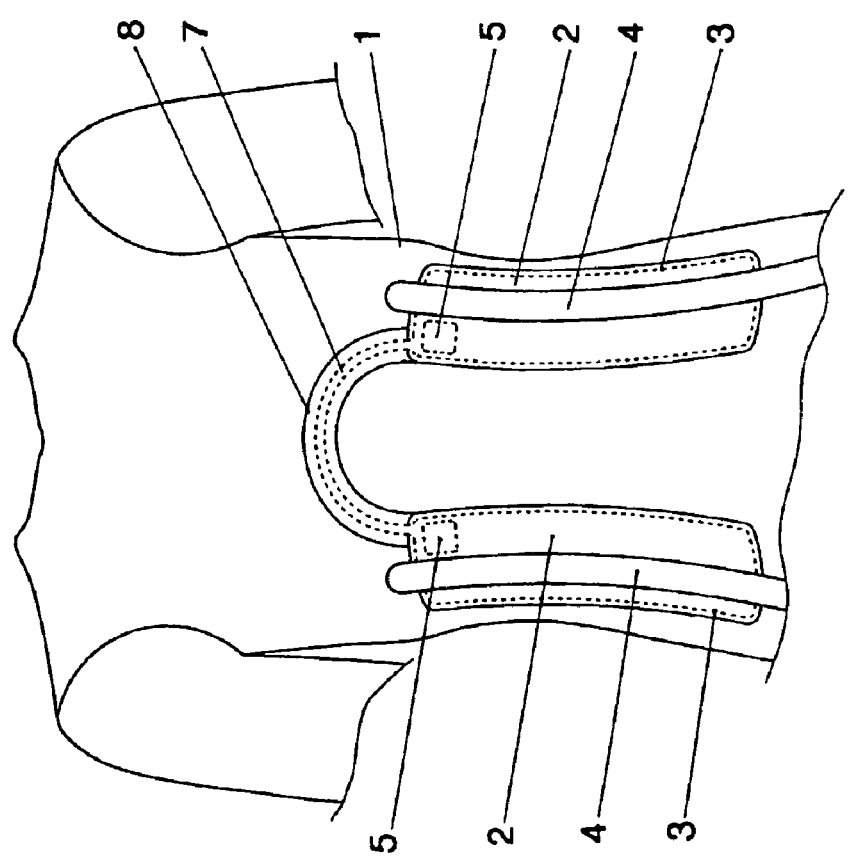

ALTITUDE PROTECTION DEVICE

The present invention relates to a device for the altitude protection of pilots and other crew members of high-performance aircraft, according to the pre-characterizing clause of claim 1. This device relates, in particular, to the altitude protection of wearers of acceleration protection suits according to the hydrostatic principle.

An altitude protection device is necessary when the pilot, and any other crew members, are exposed to sudden pressure loss in the cockpit of the aircraft, whether this is caused by a technical defect or the cockpit covering is destroyed or lost or an emergency exit become necessary. In all these situations, the pressure stabilization in the cockpit, which normally corresponds to an air pressure at about 2000 meters above sea level, collapses. The higher the flight altitude is in such an event referred to, the nearer the pressure-dependent boiling point of aqueous solutions comes to the actual body temperature of the pilot of about 37° C.

Known altitude protection devices therefore incorporate the functions of a pressure suit, such as are known from space travel and have proved appropriate for this. However, implementation of such functions always entails an increase in weight or in mass of an acceleration protection suit.

The object of the present invention is to provide a device which supplements an acceleration protection suit (referred to hereafter as a G-suit) and which, in respect of this G-suit, can afford an altitude protection which is effective for the instances mentioned, along with a negligible increase in mass of the G-suit. Furthermore, the outlay in technical and economic terms for this purpose is to be low.

The solution for achieving the set object is reproduced in the characterizing clause of Patent claim 1 with regard to its essential features and in the further patent claims with regard to further-advantageous designs.

Figure 1:
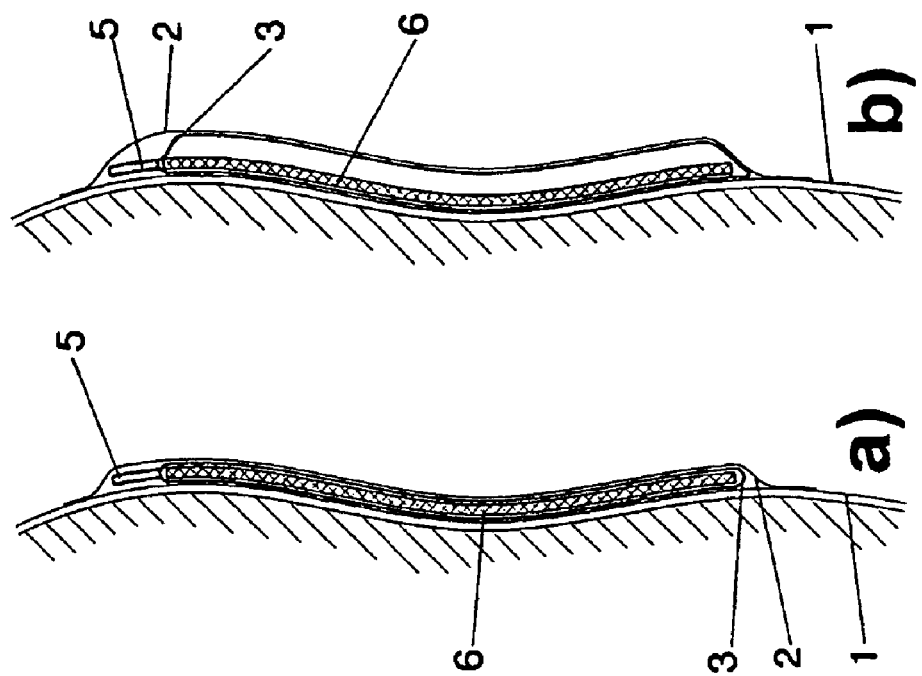
Figure 5:
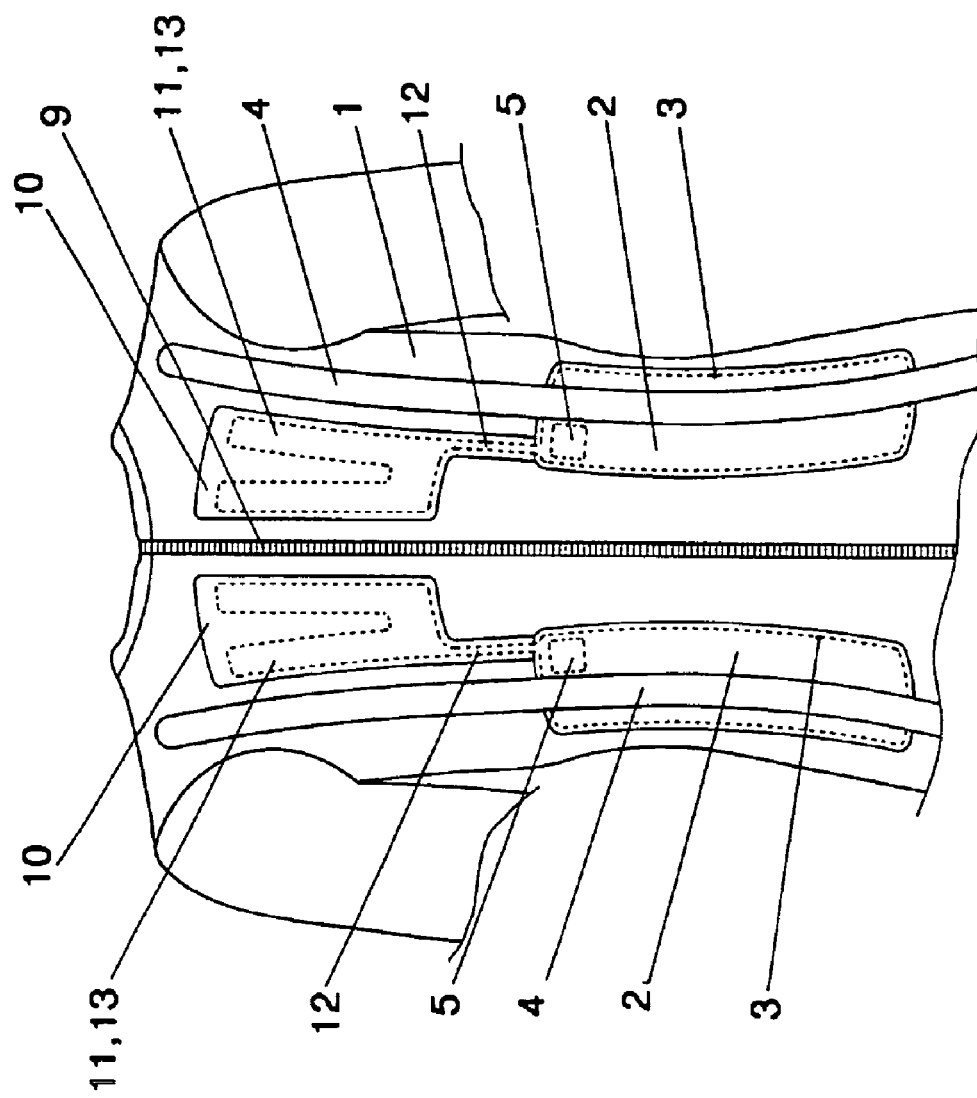

The subject of the invention is explained in more detail with reference to the accompanying drawings in which:

FIG. 1 shows a top view of the back part of a first exemplary embodiment,

FIG. 2a shows a longitudinal section through the exemplary embodiment of FIG. 1 in the inoperative state, FIG. 2b shows a longitudinal section through the exemplary embodiment of FIG. 1 in the operative state, FIG. 3 shows a top view of the back part of a second exemplary embodiment, FIG. 4 shows a top view of the front side of a third exemplary embodiment, FIG. 5 shows an addition to the exemplary embodiment of FIG. 4.

A first exemplary embodiment of the idea of the invention is illustrated in FIG. 1. It shows a top view of the back part of the G-suit 1 according to the hydrostatic principle, for example according to EP 0 983 190. This has, for example, four liquid-filled veins 4, to each on the front side and on the rear side of the G-suit. These veins 4 extend from the shoulder part of the G-suit as far as the ankles and in each case build up the hydrostatic pressure corresponding to the current acceleration load. In this case, the veins 4 are deformed from an essentially flat-lenticular cross section into a round cross section and at the same time stress the tension-resistant and low-stretch fabric of the G-suit 1. Via the tensile stress thereby prevailing in this fabric, an external pressure corresponding to his internal pressure is built up on the body of the wearer.

In the first exemplary embodiment illustrated, a pocket 2, consisting of a fabric having comparable properties to that of the G-suit 1, is stitched onto the back part of the G-suit 1. A bladder 3 (contour marked by dashes) is inserted into this pocket 2. This bladder 3, manufactured from an elastic plastic, for example PU or PVC, is closed off outwards on all sides; its communication with the surrounding air is made by means of a valve 5 which is explained in more detail with reference to FIG. 2a, b.

FIG. 2a, b show longitudinal sections AA through the pocket 2 and the adjacent parts of the G-suit 1. One or a plurality of plies of a knitted or woven spacer fabric 6 are inserted in the bladder 3. Such knitted spacer fabrics 6, produced at least partially from monofilament material, are highly flexible and deformable and at the same time, even under surface load, maintain their thickness. The size and thickness of the knitted spacer fabric 6 define in the bladder 3 a minimum volume which cannot be reduced even when the crew member leans back heavily against or, by the acceleration of the aircraft, is pressed onto the backrest of the seat.

The cockpits of combat aircraft are designed as pressurized cabins. When the aircraft is climbing, the external pressure is compensated up to a flight altitude of about 2000 meters above sea level. Above this, the internal pressure is kept constant. The valve 5 attached to or inserted into the bladder 3 is essentially a pressure-compensating valve which is open as long as $$\frac{dp}{dt} \leq \frac{dp}{dt}\bigg|_{max}$$

applies on the outside, where $$\frac{dp}{dt} = \text{rate of pressure change}\left[\frac{N}{m^2}/\text{sec}\right]$$

$$\frac{dp}{dt}\bigg|_{max} = \text{limit value of } \frac{dp}{dt}$$

When the limit value $$\frac{dp}{dt}\bigg|_{max}$$

is exceeded, the valve 5 closes.

Since, as a rule, the cabin internal pressure corresponds to the atmospheric pressure at 2000 meters above sea level, this is also the internal pressure of the bladder 3.

The actual altitude protection situation arises when $$\frac{dp}{dt} > \frac{dp}{dt}\bigg|_{max}$$

This is the case, for example,
in the event of a sudden failure of cabin-pressure supply
in the event of damage to or loss of the cockpit covering
in the event of an emergency exit by means of an ejector seat.

In such altitude protection situations, the valve 5 closes off the interior of the bladder 3 from the surrounding air.

Both the setting and the functioning of the valve 5 may either be designed to be purely mechanical or else take place by electronic and electrical means. In the latter instance, the structural part marked as the valve 5 also contains all the electronic and electrical components, including the power supply. The functioning of the altitude protection is independent in both designs of the valve 5 which are mentioned and requires no connections to the aircraft.

Thus, when the valve 5 is closed and the surrounding pressure is lower than the internal pressure of the bladder 3 limited to the value mentioned, the latter inflates according to the illustration of FIG. 2b. At the same time, the stress in the fabric of the pocket 2 rises and the latter contracts. The tensile stress σ(in N/m) in the fabric of the G-suit 1 is thereby increased, with the result, on the one hand, that the action of pressure on the wearer of the G-suit 1 is intensified and, on the other hand, that the pressure on the veins 4 also rises. The result of this, in turn, is that the tensile stress σ, which emanates from the bladder 3 located in the pocket 2 and which primarily acts only in the thorax area, is propagated over the entire G-suit 1 and exposes the wear of the G-suit 1 to an increased external pressure. This makes it possible partially to compensate the sometimes life-endangering progress of the internal pressure of the wearer of the G-suit 1 towards the boiling pressure of blood.

A second exemplary embodiment of the idea of the invention is illustrated in FIG. 3, again as a top view of the back part of the G-suit 1. Here, two pockets 2 are attached, one each under one of the veins 4 in each case. Each pocket 2 contains a bladder 3. Furthermore, each bladder 3 may be provided with a valve 5, so that the two bladders operate in parallel, but independent of one another. Each bladder 3 contains, furthermore, a knitted spacer fabric 6, not illustrated here. As a variant of this, the two bladders 3 are connected by means of a pipeline 7 which is inserted into a textile pocket 8. In this case, the two bladders 3 communicate constantly, unimpeded, and only one of the valves 5 is necessary.

Figure 2:
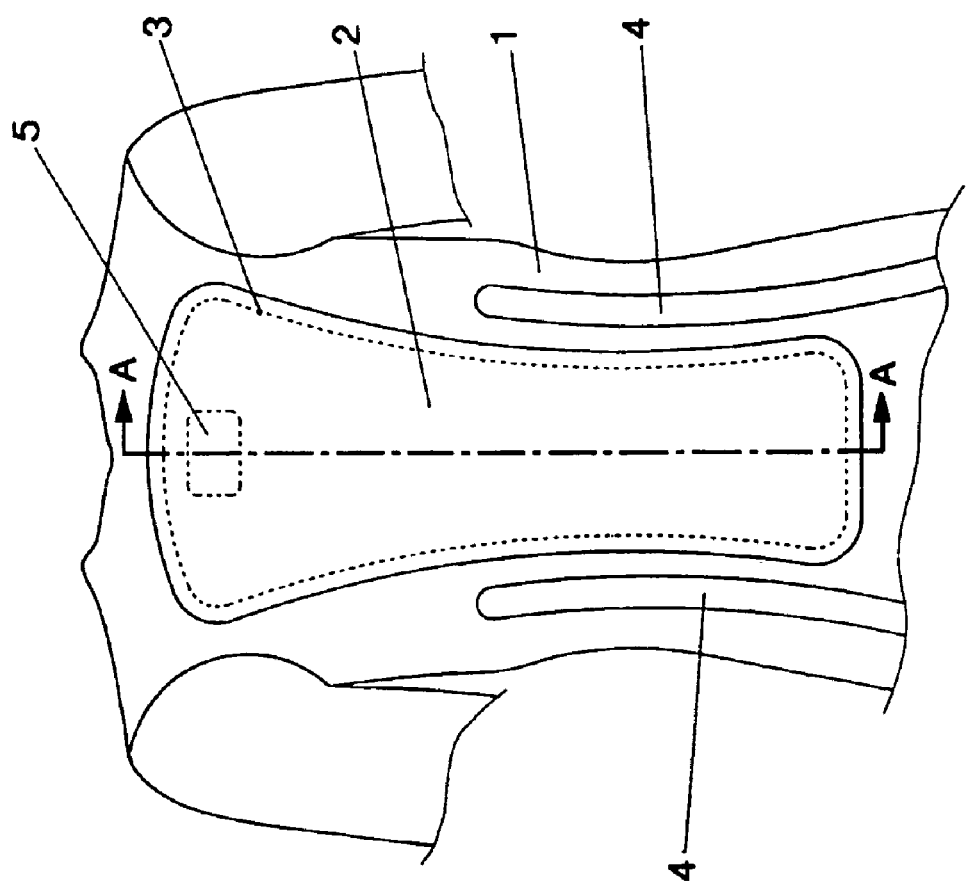

The behaviour of the valves 5, bladders 3 and pockets 2 is as described with regard to FIGS. 1, 2. The influence exerted on these two veins 4 running on the rear side of the G-suit 1 is more direct than in the first exemplary embodiment.

FIG. 4 illustrates a third exemplary embodiment of the invention in a top view of the front side of the thorax area of the G-suit 1. The pockets 2 with bladders 3 and valves 5 are likewise arranged on the front side of the G-suit 1 under the veins 4. In order to avoid, between the two bladders 3, connections which have to be made after the closing of a zip fastener 9, each bladder 3 here contains its own valve 5. The operation of this exemplary embodiment is as described with regard to that of FIG. 3.

In the fourth exemplary embodiment according to FIG. 5, an alternative or addition to the previous exemplary embodiments is illustrated. The bladders 3, or the single bladder 3 according to FIGS. 1, 2, are connected by means of a pipeline 12 having an additional volume 11, in the form of a, for example, U-shaped pipe 13 which is attached to the G-suit 1 in a further pocket 10. In a first variant, the volume 11 is provided as an addition to that contained in the bladders 3 opened by means of the knitted spacer fabrics 6. Since the volume 11 is defined, for example, by plastic pipes 13 which undergo scarcely any cross-sectional variations under the influence of the forces and stresses which occur, the air contained in the volume 11 or the volumes 11 contributes fully to building up the tensile stress generated by the bladders 3.

In a second variant, the bladders 3 contain either no knitted spacer fabrics 6 or else only a thin one. The air contained in the pipes 13 is then mainly responsible for the build-up of the tensile stress σ by means of the bladders 3 in the pockets 2.

The arrangement of the pipes 13 which is illustrated in FIG. 5 is in no way critical. Any location causing or allowing a minimum disturbance in the functioning and wearing comfort of the G-suit 1 may be selected.

In addition to the simple and cost-effective method of production of the altitude protection according to the invention, the latter has the great advantage that there is no need for a further garment, for example in the form of a jacket, which unnecessarily restricts the mobility of the crew member, that it is independent in energy and functional terms and that it requires no connecting lines to the aircraft.

What is claimed is:

1. An altitude protection device for crew members of high-performance aircraft, as an addition to an acceleration protection suit according to the hydrostatic principle which is manufactured from a high-strength and low-stretch textile fabric, with four liquid-filled veins which extend essentially over the entire length of the acceleration protection suit, characterized in that the altitude protection device comprises:

at least one pocket consisting of a textile fabric having comparable properties to that of the acceleration protection suit, which is stitched to the latter;

for each pocket, at least one bladder comprised of an elastic plastic;

for each of the at least one bladder, a valve which can connect the interior of the bladder to the surrounding air and can close it off from the latter; and the valve remaining open in so far as $$\frac{dp}{dt} \leq \frac{dp}{dt}\bigg|_{max}$$

the valve closing in so far as $$\frac{dp}{dt} > \frac{dp}{dt}\bigg|_{max}$$

where $$\frac{dp}{dt}$$

represents the rate of pressure change of the surrounding air and $$\left[\frac{dp}{dt}\right] = \frac{N}{m^2}\bigg/\text{sec.}$$

and $$\frac{dp}{dt}\bigg|_{max}$$

represents a presettable limit value of this rate of pressure change.

2. The altitude protection device according to claim 1, characterized in that the valve is purely mechanical.

3. The altitude protection device according to claim 1, characterized in that the valve has an electronic control and electric actuation and the supply of energy for these is also contained in the valve.

4. The altitude protection device according to claim 1, characterized in that the at least one bladder contains a knitted spacer fabric which gives it a predetermined minimum volume even under mechanical load.

5. The altitude protection device according to claim 4, characterized in that exactly one pocket with a bladder and with a valve is present and is fastened to the back side of the acceleration protection suit in such a way that it comes to lie between the veins running on the back side of the acceleration protection suit.

6. The altitude protection device according to claim 4, characterized in that two pockets, each with a bladder and each with a valve, are present and are fastened next to one another on the back side of the acceleration protection suit in such a way that they come to lie in each case under one of the veins running on the back side of the acceleration protection suit.

7. The altitude protection device according to claim 6, characterized in that a first pipeline is present and is inserted in a pocket stitched to the acceleration protection suit, which pipeline connects the two bladders.

8. The altitude protection device according to claim 4, characterized in that two pockets, each with a bladder, are fastened next to one another on the back side of the acceleration protection suit in such a way that they come to line in each case under one of the veins running on the back side of the acceleration protection suit, and in that a first pipeline is present and is inserted in a pocket stitched to the acceleration protection suit, which pipeline connects the two bladders, and, overall, only one valve is present and is inserted in one of the bladders.

9. The altitude protection device according to claim 4, characterized in that two pockets, each with a bladder and each with a valve are present and are fastened next to one another to the front side of the acceleration protection suit in such a way that they come to lie in each case under one of the veins running on the front side of the acceleration protection suit.

10. The altitude protection device according to claim 1, characterized in that at least one additional volume communicating with the at least one bladder by means of a further pipeline is present and is surrounded by a plastic pipe non-deformable by the forces and tensile stresses to be provided, which plastic pipe is accommodated in a further pocket on the acceleration protection suit.

* * * * *